United States Patent
Sheidler (10) Patent No.: US 11,439,064 B2
(45) Date of Patent: Sep. 13, 2022

(54) PRE-UNLOADING POWER REDUCTION SYSTEM AND METHOD

(71) Applicant: DEERE & COMPANY, Moline, IL (US)

(72) Inventor: Alan D. Sheidler, Moline, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/984,553

(22) Filed: Aug. 4, 2020

(65) Prior Publication Data

US 2022/0039319 A1 Feb. 10, 2022

(51) Int. Cl.
*A01D 43/08* (2006.01)
*A01D 41/127* (2006.01)
*F02D 41/02* (2006.01)

(52) U.S. Cl.
CPC ....... *A01D 43/085* (2013.01); *A01D 41/1271* (2013.01); *A01D 41/1274* (2013.01); *F02D 41/021* (2013.01); *F02D 41/0205* (2013.01); *F02D 2200/101* (2013.01)

(58) Field of Classification Search
CPC ............ A01D 41/1271; A01D 41/1274; A01D 43/085; F02D 41/021; F02D 41/0205; F02D 2200/101; F02D 29/04
See application file for complete search history.

(56) References Cited

U.S. PATENT DOCUMENTS

| | | | |
|---|---|---|---|
| 3,093,946 A * | 6/1963 | Pitt | B60W 10/06 460/6 |
| 6,397,571 B1 | 6/2002 | Ehrecke | |
| 6,655,351 B2 | 12/2003 | Sheidler et al. | |
| 7,779,616 B2 | 8/2010 | Sheidler et al. | |
| 7,945,378 B2 | 5/2011 | Sheidler et al. | |
| 8,352,155 B2 | 1/2013 | Schindler et al. | |
| 8,781,694 B1 * | 7/2014 | Sheidler | A01D 41/1274 701/50 |
| 8,897,943 B2 | 11/2014 | Sheidler et al. | |
| 9,254,833 B2 | 2/2016 | Shin et al. | |
| 2012/0151891 A1 * | 6/2012 | Wolfcarius | A01D 43/085 56/10.2 A |
| 2015/0264866 A1 * | 9/2015 | Foster | A01D 41/1217 414/21 |
| 2017/0370303 A1 * | 12/2017 | Altmann | A01D 69/00 |

FOREIGN PATENT DOCUMENTS

DE 102008036378 * 2/2010 ......... A01D 41/1274
JP 2001320805 A 11/2001

* cited by examiner

*Primary Examiner* — George C Jin
(74) *Attorney, Agent, or Firm* — Taft Stettinius & Hollister LLP; Stephen F. Rost (57) ABSTRACT

A work machine for harvesting crop includes a controller and an engine. The controller is configured to command operation of the engine in accordance with various power curves based on sensed factors associated with the harvested crop. The work machine stores the harvested crop in a tank to be unloaded by an unloading auger which is powered by the engine. Prior to activation of the unloading auger, the controller commands the engine to operate in accordance with a power curve associated with a reduced power level to reserve power for operation of the unloading auger.

18 Claims, 6 Drawing Sheets

PRE-UNLOADING POWER REDUCTION SYSTEM AND METHOD

FIELD OF THE DISCLOSURE

The present disclosure relates to agricultural machinery with a harvester head, and more particularly to a control system and method for an agricultural machine with a harvester head.

BACKGROUND

Many work machines, and in particular agricultural work machines, have one or more tanks for containing harvested crops such as grain or corn. The harvested crops must be unloaded from a tank during harvesting operations to make space for additional harvested crop to be contained in the tank. An unloading system, sometimes an unloading auger, may be activated, i.e., switched on, to unload harvested crop from the tank. Operation of the unloading system is associated with an increased power demand on the engine of the work machine.

Power curves or torque curves represent the power or torque output by the engine relative to the engine speed. Conventional work machines, and in particular conventional harvesters, may operate according to a nominal power curve representing the power output by the engine relative to the engine speed during a normal harvesting operation.

The increased power demand resulting from operation of the unloading system may be satisfied by operating the work machine in a boost mode, whereby the engine is operated according to a boosted power curve. The boosted power curve has a greater power output at certain speeds of the engine compared to the nominal power curve.

If the increased power demand is especially high, for example, as with high moisture corn, the power demand may be greater than the power made available by the engine. This results in reduced engine speed, insufficient ground speed of the work machine, and reduced overall harvesting efficiency.

What is needed, therefore, is a system and method for identifying an increased power demand prior to its occurrence. What is also needed is a pre-unloading power curve that is associated with a lesser power output at certain speeds of the engine compared to the nominal power curve, such that, additional power is reserved for an operational change of the machine to the boost mode. What is also needed is a system and method to adjust the machine from operation according to the nominal power curve to operation according to the pre-unloading power curve, based on an identified increased power demand prior to its occurrence.

SUMMARY

In an illustrative embodiment, a work machine includes: a supporting structure; a harvester assembly coupled to the supporting structure; ground engaging mechanisms coupled to the supporting structure; a tank coupled to the supporting structure and configured to contain harvested crop harvested by the harvester assembly; an engine configured to drive rotation of the ground engaging mechanisms to move the supporting structure during operation of the work machine; a controller operatively coupled to the engine, the controller including a memory and a first power curve and a second power curve stored in the memory, the second power curve having a lesser power level relative to the first power curve over a range of engine speeds; an operator input device operatively coupled to the controller and configured to send signals to the controller; wherein the controller is configured to operate the engine, in response to signals received from the operator input device, in: (i) a nominal mode associated with the first power curve; (ii) a reserve mode associated with the second power curve; and (iii) an automatic mode associated with the first power curve and the second power curve; wherein, in the automatic mode, the controller is configured to change operation of the engine from operation in accordance with the first power curve to operation in accordance with the second power curve in response to at least one sensed factor associated with the harvested crop.

In some embodiments, the work machine includes a crop sensor operatively coupled to the controller and configured to identify an amount of harvested crop in the tank, and the at least one sensed factor associated with the harvested crop includes the amount of harvested crop in the tank. In some embodiments, the crop sensor is configured to identify a flow rate of harvested crop into the tank, and the at least one sensed factor associated with the harvested crop further includes the flow rate of harvested crop into the tank.

In some embodiments, the work machine includes an unloading device coupled to the engine and arranged to contact harvested crop contained in the tank. The unloading device is configured to be switched on and off. The unloading device is configured to remove harvested crop from the tank when switched on. In automatic mode, the controller is configured to change operation of the engine from operation in accordance with the first power curve to operation in accordance with the second power curve prior to the unloading device being switched on.

In some embodiments, the controller includes a third power curve stored in the memory that has a greater power level over the range of engine speeds relative to the first power curve. The controller is configured to operate the engine in a boost mode associated with the third power curve. The controller is configured to change operation of the engine from operation in accordance with the second power curve to operation in accordance with the third power curve when the unloading device is switched on.

In some embodiments, the work machine includes a moisture sensor operatively coupled to the controller and configured to identify the moisture level of harvested crop in the tank, the at least one sensed factor associated with the harvested crop includes the moisture level of harvested crop in the tank.

In some embodiments, the controller includes a plurality of additional power curves stored in the memory. Each additional power curve of the plurality of additional power curves has a power level between that of the first power curve and the second power curve over the range of engine speeds. In automatic mode, the controller is configured to change operation of the engine from operation in accordance with the first power curve to operation in accordance with each additional power curve successively, and subsequently, to operation in accordance with the second power curve in response to at least one sensed factor associated with the harvested crop.

In some embodiments, the harvester assembly is one of: a grain harvester for harvesting grain and a corn harvester for harvesting corn, and the work machine includes a harvester sensor operatively coupled to the controller and configured to identify whether the harvester assembly is a grain harvester or a corn harvester.

In some embodiments, the controller includes a first supplementary power curve and a second supplementary curve stored in the memory. The second supplementary power curve has a lesser power level relative to the first supplementary power curve over the range of engine speeds. The difference in power level of the first supplementary power curve relative to the second supplementary power curve over the range of engine speeds is greater than the difference in power level of the first power curve relative to the second curve over the range of engine speeds.

In automatic mode, the controller is configured to change operation of the engine from operation in accordance with the first supplementary power curve to operation in accordance with the second supplementary power curve in response to at least one sensed factor associated with the harvested crop. In automatic mode, in response to determining that the harvester assembly is a grain platform, the controller is configured to operate the engine in accordance with the first power curve and subsequently the second power curve. In automatic mode, in response to determining that the harvester assembly is a corn header, the controller is configured to operate the engine in accordance with the first supplementary power curve and subsequently the second supplementary power curve.

In some embodiments, the work machine further comprises a weight sensor operatively coupled to the controller and configured to identify the weight of harvested crop in the tank, and the at least one sensed factor associated with the harvested crop includes the weight of harvested crop in the tank.

In another illustrative embodiment, a work machine includes: a supporting structure; a harvester assembly coupled to the supporting structure; ground engaging mechanisms coupled to the supporting structure; a tank coupled to the supporting structure and configured to contain harvested crop; an unloading device that is configured to remove harvested crop from the tank when the unloading device is activated; an engine coupled to the supporting structure and configured to provide power to the ground engaging mechanisms and the unloading device; and a controller operatively coupled to the engine and including a memory having a first power curve, a second power curve, and a third power curve stored thereon. The second power curve has a lesser power level relative to the first power curve over a range of engine speeds, and the third power curve has a greater power level relative to the first power curve over the range of engine speeds. The controller is configured to change operation of the engine from operation in accordance with the first power curve to operation in accordance with the second power curve in response to at least one sensed factor associated with the harvested crop and, subsequently, operate the engine in accordance with the third power curve when the unloading device is activated.

In some embodiments, the work machine includes a crop sensor operatively coupled to the controller and configured to identify an amount of harvested crop in the tank, and the at least one sensed factor associated with the harvested crop includes the amount of harvested crop in the tank. In some embodiments, the crop sensor is configured to identify a flow rate of harvested crop into the tank, and the at least one sensed factor associated with the harvested crop further includes the flow rate of harvested crop into the tank.

In some embodiments, the work machine includes a moisture sensor operatively coupled to the controller and configured to identify the moisture level of harvested crop in the tank, and the at least one sensed factor associated with the harvested crop includes the moisture level of harvested crop in the tank.

In some embodiments, the work machine includes a weight sensor operatively coupled to the controller and configured to identify the weight of harvested crop in the tank, and the at least one sensed factor associated with the harvested crop includes the weight of harvested crop in the tank.

In some embodiments, the controller includes a plurality of additional power curves stored in the memory. Each additional power curve of the plurality of additional power curves has a power level between that of the first power curve and the second power curve over the range of engine speeds. The controller is configured to change operation of the engine from operation in accordance with the first power curve to (i) operation in accordance with each additional power curve successively and subsequently to (ii) operation in accordance with the second power curve in response to at least one sensed factor associated with the harvested crop.

In another illustrative embodiment, a method of operating a work machine includes: operating an engine of the work machine in accordance with a first power curve having a first power level over a range of engine speeds; determining that a tank configured to contain harvested crop has been filled with harvested crop above a predetermined upper threshold crop level; and operating the engine of the work machine in accordance with a second power curve having a second power level lesser than the first power level over the range of engine speeds, in response to determining that the tank has been filled with harvested crop above the predetermined upper threshold crop level.

In some embodiments, the method includes activating an unloading device powered by the engine to remove harvested crop from the tank subsequent to operating the engine of the work machine in accordance with the second power curve.

In some embodiments, the method includes operating the engine of the work machine, during operation of the unloading device, in accordance with a third power curve having a third power level greater than the first power level over the range of engine speeds.

In some embodiments, the method includes determining that the moisture level of the harvested crop in the tank is above a predetermined harvested crop moisture level threshold prior to operating the engine of the work machine in accordance with the second power curve. Operating the engine of the work machine in accordance with the second power curve further includes: operating the engine of the work machine in accordance with the second power curve in response to determining that the moisture level of the harvested crop in the tank is above the predetermined harvested crop moisture level threshold.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
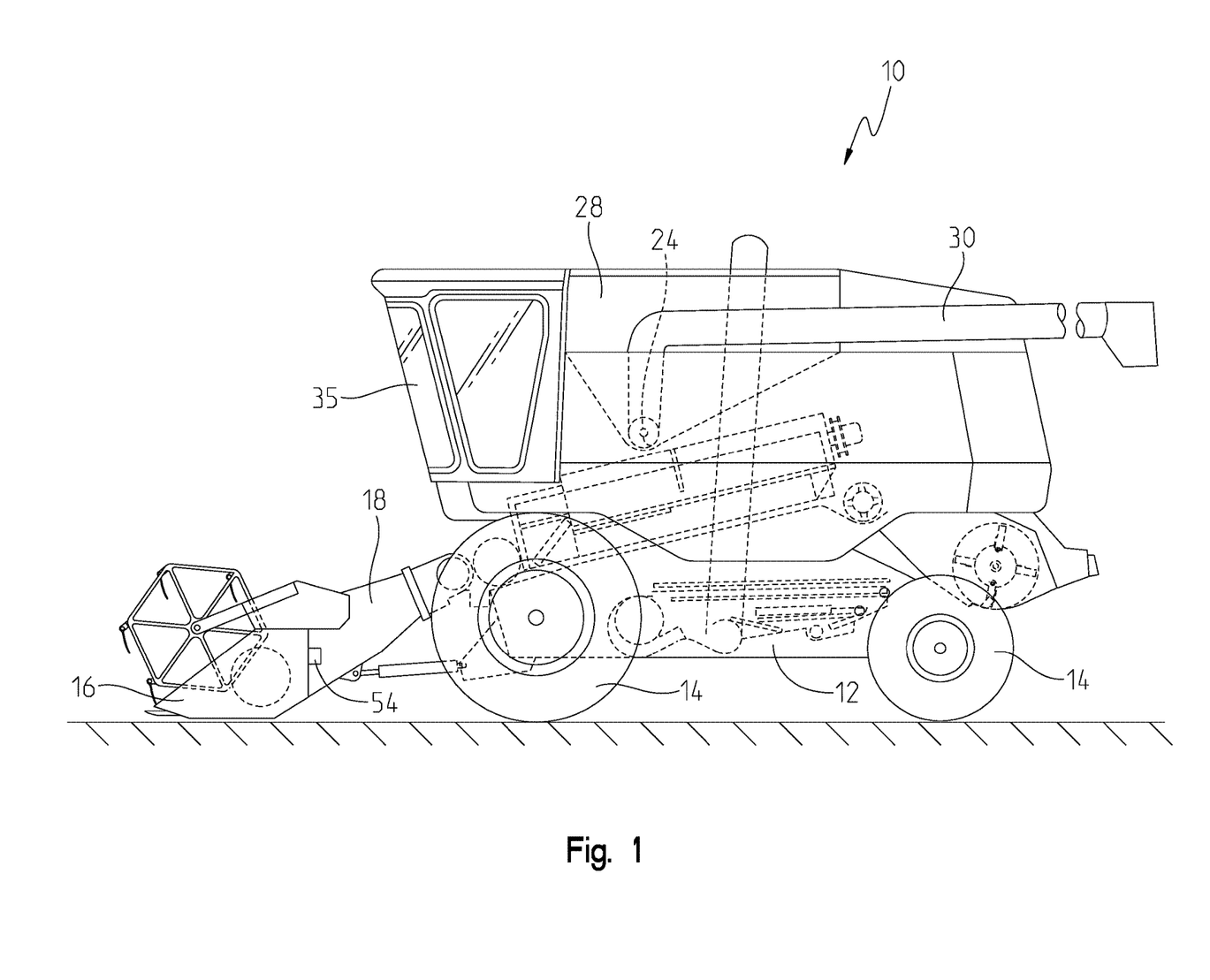
FIG. 1 illustrates a side view of a work machine with a grain platform harvester assembly, a tank, and an unloading auger.

FIG. 1 shows an agricultural work machine 10 comprising a supporting structure 12 that is coupled to and supported above the ground by ground engaging mechanisms 14, such as wheels, that extend from the supporting structure 12. The supporting structure 12 may also be referred to as a frame 12. In the illustrative embodiment, the work machine 10 is a combine harvester; although, the work machine 10 may take other forms suitable for use with the unloading control system and methods described herein. Although the combine harvester is illustrated as having wheels, it could also have ground engaging tracks in place of some or all of the wheels.

Figure 2:
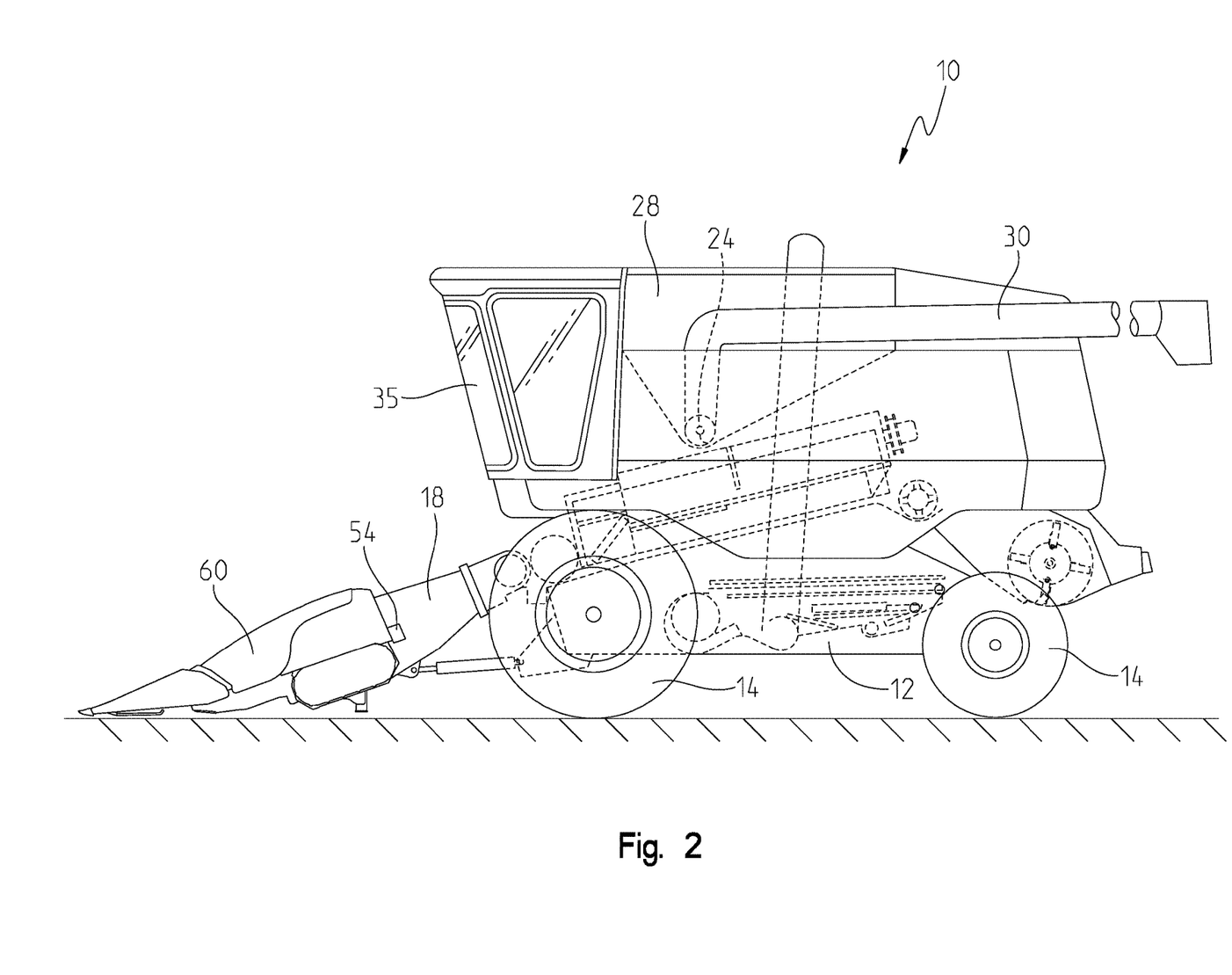
FIG. 2 illustrates a side view of a work machine with a corn header harvester assembly, the tank, and the unloading auger.

Various harvester assemblies, such as harvester assembly 16 shown in FIG. 1 and harvester assembly 60 shown in FIG. 2, are detachably mounted to a feederhouse 18. The feederhouse 18 is coupled to the supporting structure 12 and contains a conveyor for conveying the harvested crop toward internal components of the work machine 10 to be processed thereby. The internal components may include a threshing unit having at least a rotor and a cleaning shoe. The various harvester assemblies may comprise a variety of harvesting configurations, including a grain platform 16, a corn header 60, a row crop header, a pickup platform, or any other type of harvesting device suitable for use with the unloading control system and methods described herein.

In FIG. 1, a harvester assembly in the form of the grain platform 16 is mounted to the feederhouse 18. In FIG. 2, a harvester assembly in the form of the corn header 60 is mounted to the feederhouse 18. In either case, the work machine 10 may include a harvester sensor 54 configured to identify whether the corn header 60, the grain platform 16, or another harvester assembly is mounted to the feederhouse 18. In the illustrative embodiment, the harvester sensor 54 is positioned on the feederhouse 18; however, it should be appreciated that the harvester sensor 54 may be positioned elsewhere on the work machine 10 so long as the harvester sensor 54 is arranged such that it identifies which harvester assembly is coupled to the feederhouse 18.

Harvested crop is processed by the work machine 10 and moved to a tank 28. The tank 28 may be directly or indirectly coupled to the supporting structure 12 and supported above the ground thereby. A crop sensor 24 may be positioned in the tank 28 and configured to identify the amount of harvested crop in the tank 28. In some embodiments, the crop sensor 24 is configured to identify the remaining capacity of the tank 28 suitable for storing additional harvested crop. It should appreciated that the crop sensor 24 may be positioned elsewhere on the work machine 10 so long as the crop sensor 24 is arranged such that it may identify the amount of harvested crop in the tank 28 or the remaining capacity of the tank 28 for additional harvested crop. For example, the crop sensor 24 may be positioned upstream of the tank 28.

In some embodiments, the crop sensor 24 may be configured to identify additional characteristics of the harvested crop. For example, the crop sensor 24 may identify the moisture level of the harvested crop, the flow rate of harvested crop into the tank 28, and/or the weight of the harvested crop in the tank 28. In some embodiments, the crop sensor 24 may be first sensor and the work machine 10 may include a separate moisture sensor 74. In some embodiments, the work machine 10 includes a separate flow rate sensor 64. In some embodiments, the work machine 10 includes a separate weight sensor 84. Each sensor described herein, whether separately defined or embodied as a single multipurpose sensor, may sense the abovementioned characteristics of the work machine 10 or the harvested crop in a manner consistent with that known in the art.

The harvested crop in the tank 28 may be unloaded into a grain cart, truck, or trailer by an unloading device 30, for example, the unloading auger 30 shown in FIGS. 1 and 2. A first end of the unloading device 30 may be coupled to and positioned in tank 28. The first end of the unloading device 30 is in fluid communication with an internal portion of the tank 28, which contains the harvested crop. In other words, the first end of the unloading device 30 is in fluid communication with the harvested crop contained in the tank 28 to facilitate unloading of the harvested crop. A second end of the unloading device 30 is positioned away from the tank 28. The second end of the unloading device 30 may be movable relative to the first end to direct the harvested crop out of the tank 28 to a desired location, such as the grain cart, truck, or trailer. As the harvested crop is unloaded from the tank 28, the remaining capacity of the tank 28 increases. A grain cart sensor 94 may be positioned on the unloading device 30, the tank 28, or elsewhere and may be configured to indicate the presence of a gain cart, truck, or trailer to receive the unloaded crop from the unloading device 30.

The unloading device 30 is powered by an engine 32. The engine 32 also powers the ground engaging mechanisms 14 to propel the work machine 14, for example, during a harvesting operation. The engine 32 is directly or indirectly coupled to and supported by the supporting structure 12. Power to the engine 32 may be adjusted by a controller 34.

In some embodiments, the unloading device 30 may be switched on and off manually by an operator or other user. For example, as suggested by FIG. 3, the unloading device 30 may be switch on in response to the operator or other user manipulating an operator input device 36. The operator input device 36 may be housed in the cab 35 or positioned away from the work machine 10. The operator input device 36 may include a switch, lever, button, touch-responsive indicator, or the like that is engaged by the operator to activate the unloading auger 30. For example, in response to engagement of the operator input device 36, a hydraulic cylinder maybe pressurized by actuation of a solenoid valve which sends oil to the hydraulic cylinder causing movement thereof, which activates the unloading auger 30.

In some embodiments, the unloading auger 30 may be switched on and off in response to commands received from the controller 34. For example, the controller 34 may receive a signal associated with the harvested crop, which triggers the controller 34 to command activation of the unloading auger 30, as will be described in more detail below.

Figure 3:
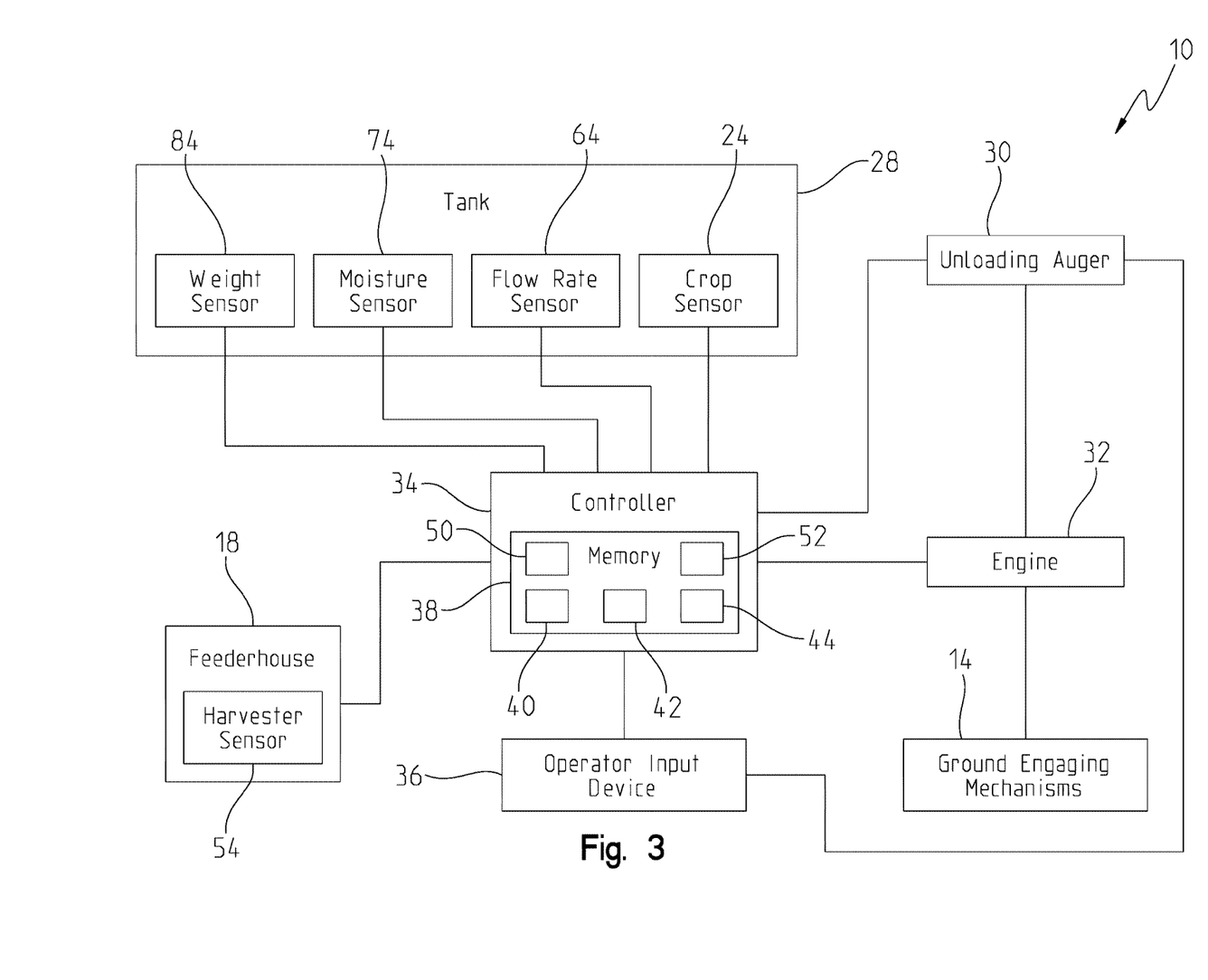
FIG. 3 illustrates a diagrammatic view of the work machine showing a controller storing power curves associated with various operational modes of the work machine.

Referring still to FIG. 3, the controller 34 commands the engine 32 to operate according to one of a plurality of power curves, such as power curves 40, 42, 44, 50, 52. The controller 34 may include a memory 38 and a processor configured to execute instructions (e.g., algorithmic steps) stored on the memory 38. The memory 38 may have the plurality of power curves stored thereon, and the controller 34 may command the engine 32 to operate in accordance any one of the power curves, as will be described in greater detail below.

The controller 34 may be a single controller or a plurality of controllers operatively coupled to one another. The controller 34 may be hardwired or connected wirelessly (i.e. operatively coupled) to other components of the work machine 10, such as the engine 32, the sensors 24, 54, 64, 74, 84, 94 and the operator input device 36. The controller 34 may be operatively coupled to such components via Wi-Fi, Bluetooth, or other known means of wireless communication. Thus, the controller 34 may be housed by the work machine 10 or positioned remotely, away from the work machine 10.

Figure 4:
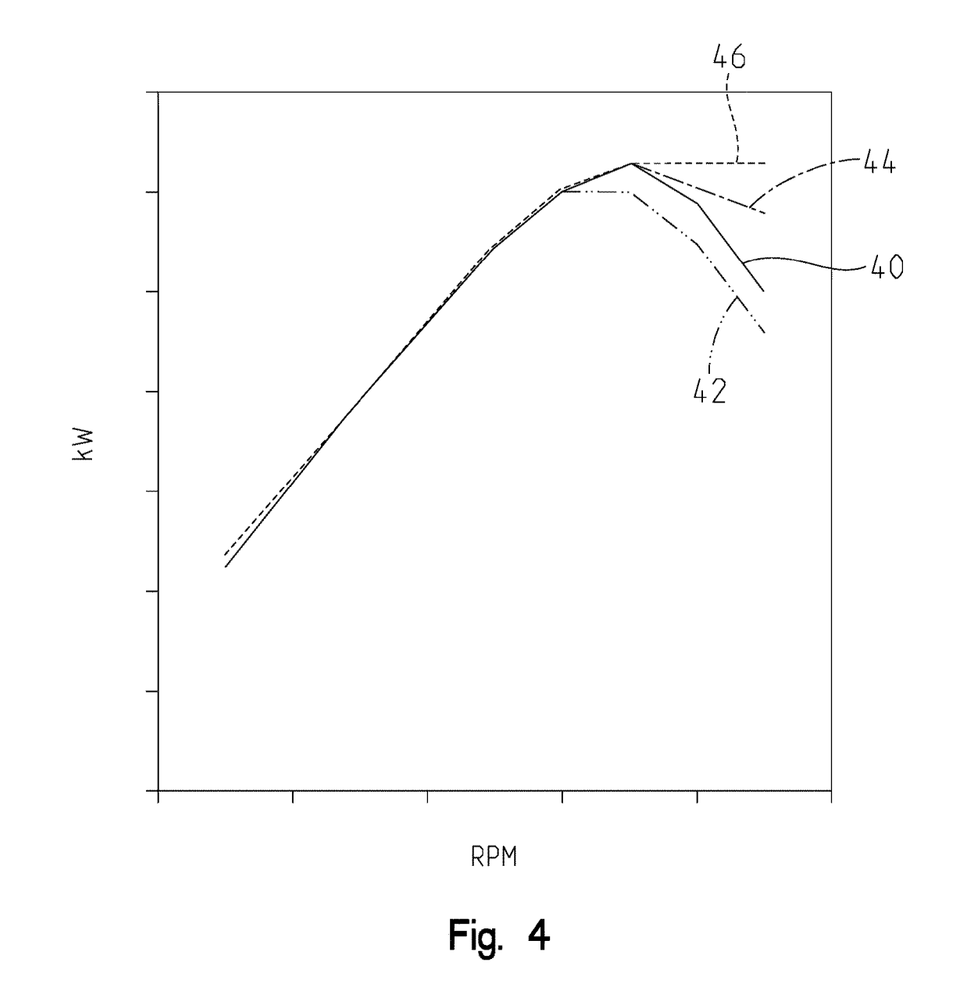
FIG. 4 illustrates a graph showing power curves associated with the various operational modes of the engine.

As shown in FIG. 4, the memory 38 includes the first power curve 40, the second power curve 42, and the third power curve 44. The first power curve 40 may be referred to as a nominal curve; the second power curve 42 may be referred to as a reduced, reserve, or pre-unloading power curve; and the third power curve 44 may be referred to as a boost curve. For each power curve, at a given engine speed, the engine 32 operates at the associated power level indicate by that particular power curve.

FIG. 4 shows the power curves 40, 42, 44 illustrated together on a single graph. FIG. 4 also shows a maximum operational power level (kW) of the engine 32 over the illustrated range of engine speeds (RPM). The maximum operational power level is indicated by reference number 46. The second power curve 42 has a lesser power level (kW) relative to the first power curve 40 over the illustrated range of engine speeds (RPM). The third power curve 44 has a greater power level (kW) relative to the first power curve 40 over the illustrated range of engine speeds (RPM).

The controller 34 is configured to operate the engine 32 according to various operational modes associated with one or more power curves. For example, the controller 34 is configured to operate the engine 32 in: (i) a nominal mode associated with the first power curve 40; (ii) a reserve mode associated with the second power curve 42; and (iii) an automatic mode associated with the first power curve 40 and the second power curve 42.

In use, an operator or other user manipulates the operator input device 36, such that the operator input device 36 selects an operational mode. The controller 34 receives the signal associated with the selected operational mode, and the controller 34 commands the engine 32 to operate in accordance with the power curve associated with the selected operational mode. In the nominal and reserve modes, the engine 32 operates according to a single selected power curve associated with the selected operational mode.

In the automatic mode, the controller 34 is configured to automatically change operation of the engine 32 from operation in accordance with the first power curve 40 to operation in accordance with the second power curve 42 in response to at least one sensed factor associated with the harvested crop. As alluded to above, in use, one or more sensors 24, 54, 64, 74, 84 sense one or more characteristics or factors associated with the harvested crop. The one or more sensed factors include, for example: (i) amount of harvested crop in the tank 28, (ii) flow rate of harvested crop into the tank 28, (iii) moisture level of harvested crop in the tank 28, (iv) weight of harvested crop in the tank 28, (v) type of crop being harvested based on whether the detected harvester assembly is a grain harvester 16 or a corn harvester 60. Each sensor 24, 54, 64, 74, 84 may send a signal to the controller 34 indicative of the sensed factors.

Figure 5:
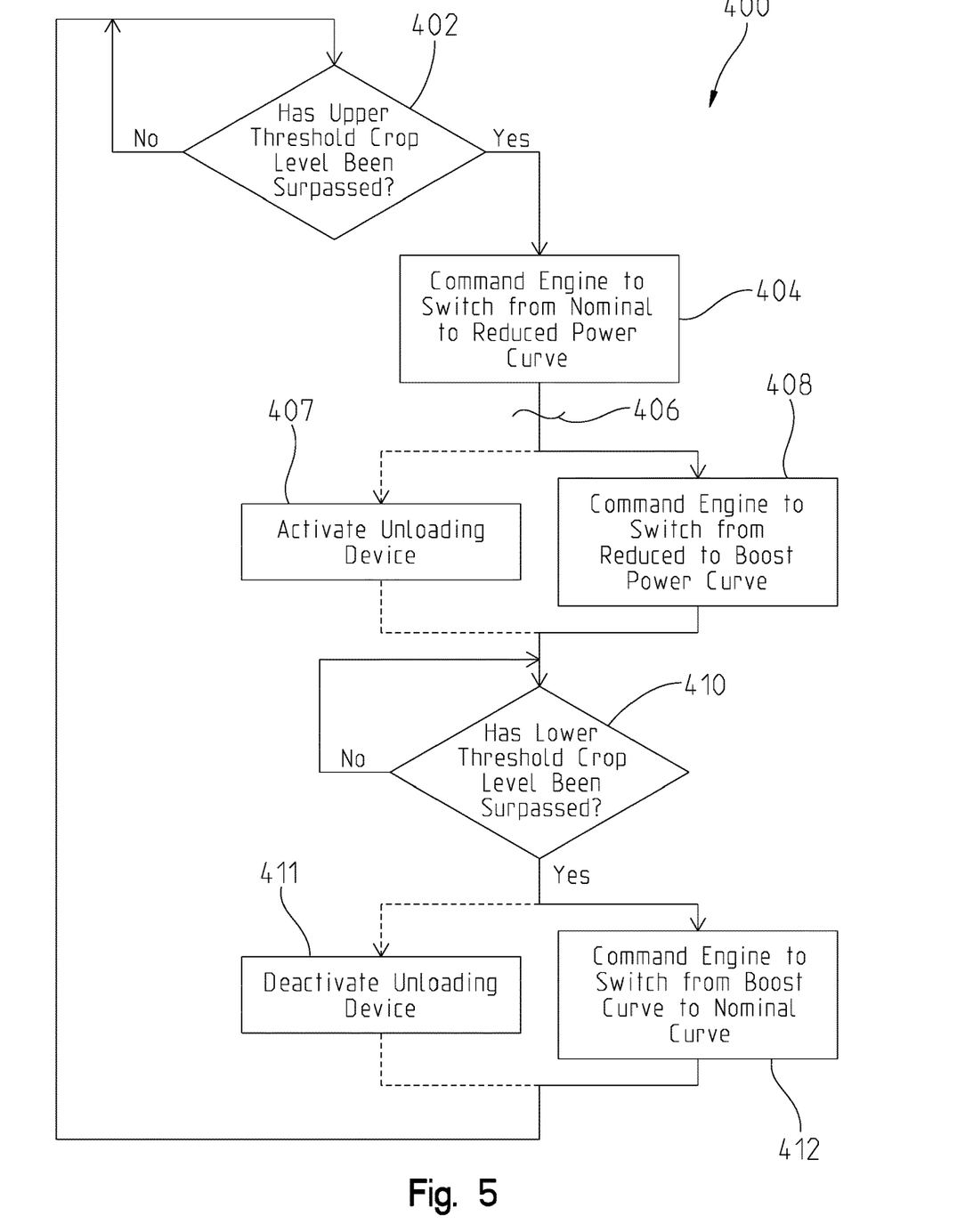
FIG. 5 illustrates a flow chart showing a method of operation of the work machine based on crop level in the tank.

Referring now to FIG. 5, an exemplary method of operation 400 is shown. When the engine 32 is operating in accordance with the first power curve 40, the crop sensor 24 sends a signal to the controller 34 indicating that the amount of harvested crop in the tank 28 has surpassed a predetermined upper threshold crop level. In other words, in step 402, the controller 34 determines, based on receipt of signals from the crop sensor 24, whether the predetermined upper threshold crop level has been surpassed. If the predetermined upper threshold crop level has been surpassed, then the control method 400 moves onto step 404. If not, step 402 is repeated.

In step 404, in response to receipt of the signal, (i.e. if the predetermined upper threshold crop level has been surpassed), the controller 34 commands to engine 32 to operate in accordance with the second power curve 42. As described above, the second power curve 42 has a lesser power level over the illustrated range of engine speeds than does the first power curve 40. As a result of switching operation of the engine 32 to that in accordance with a lesser power level, more power is made available for other functions powered by the engine 32. For example, during operation in accordance with the second power curve 42, more power is available for operation of the unloading device 30. Reserving power for the unloading device 30 ensures that ground speed of the work machine 10 is not adversely affected and that the engine 32 is not commanded to output more power than the maximum operational power level 46 available to the engine 32.

In the some embodiments, in step 407, subsequent to the engine 32 beginning to operate in accordance with the second power curve 42, the controller 34 activates the unloading device 30. Activation of the unloading device 30 may occur in response to receiving the signal from the controller 34 indicating that the upper threshold crop level has been surpassed and/or in response to another trigger.

In the illustrative embodiment, receipt of another trigger is shown by step 406. Other triggers may include, for example, a secondary upper threshold crop level being surpassed, expiration of predetermined amount of time from the instant that the upper threshold crop level was surpassed, receipt of a feedback signal indicating that the engine 32 is operating in accordance with the second power curve 44, or engagement of the operator input device 36 by the operator or other user. Another trigger may include receipt of a signal from the grain cart sensor 94 indicating the presence of a gain cart, truck, or trailer to receive the unloaded crop.

It should be appreciated that step 407 is shown in phantom to reflect that, in some embodiments, the unloading device 30 is not automatically activated by the controller 34, and instead, the unloading device 30 is activated manually based on engagement of the operator input device 36 by the operator or other user.

When activated (i.e. switched on), the unloading device 30 is powered by the engine 32 to remove harvested crop from the tank 28. As shown in step 408, when the unloading device 30 is activated, the controller 34 commands the engine 32 to operate in accordance with the third power curve 44. As described above, the third power curve 44 has a greater power level over the range of engine speeds than does the first power curve 40.

When a suitable amount of harvested crop has been removed from the tank 28, the controller 34 may receive a signal from the crop sensor 24 indicating such. In other words, in step 410, the controller 34 determines (based on receipt of signals from the crop sensor 24) whether a predetermined lower threshold crop level has been surpassed. If the predetermined lower threshold crop level has been surpassed, then the control method 400 moves onto steps 411 and/or 412. If the predetermined lower threshold crop level has not been surpassed, step 410 is repeated.

In step 412, in response to receiving the signal indicating that the lower threshold crop level has been surpassed, the controller 34 commands the engine 32 to resume operation in accordance with the first power curve 40.

In some embodiments, in step 411, the controller 34 deactivates the unloading device 30 in response to receiving the signal indicating that the lower threshold crop level has been surpassed. In some embodiments, an operator or other user manipulates the operator input device 36 to deactivate the unloading device 30. Step 411 is shown in phantom to reflect that the controller 34 may or may not control deactivation of the unloading device 412.

After the engine 32 has resumed operation in accordance with the first power curve 40, the method of operation 400 continues by repeating itself, starting with step 402. This cycle occurs throughout the harvesting operation of the work machine 10.

Figure 6:
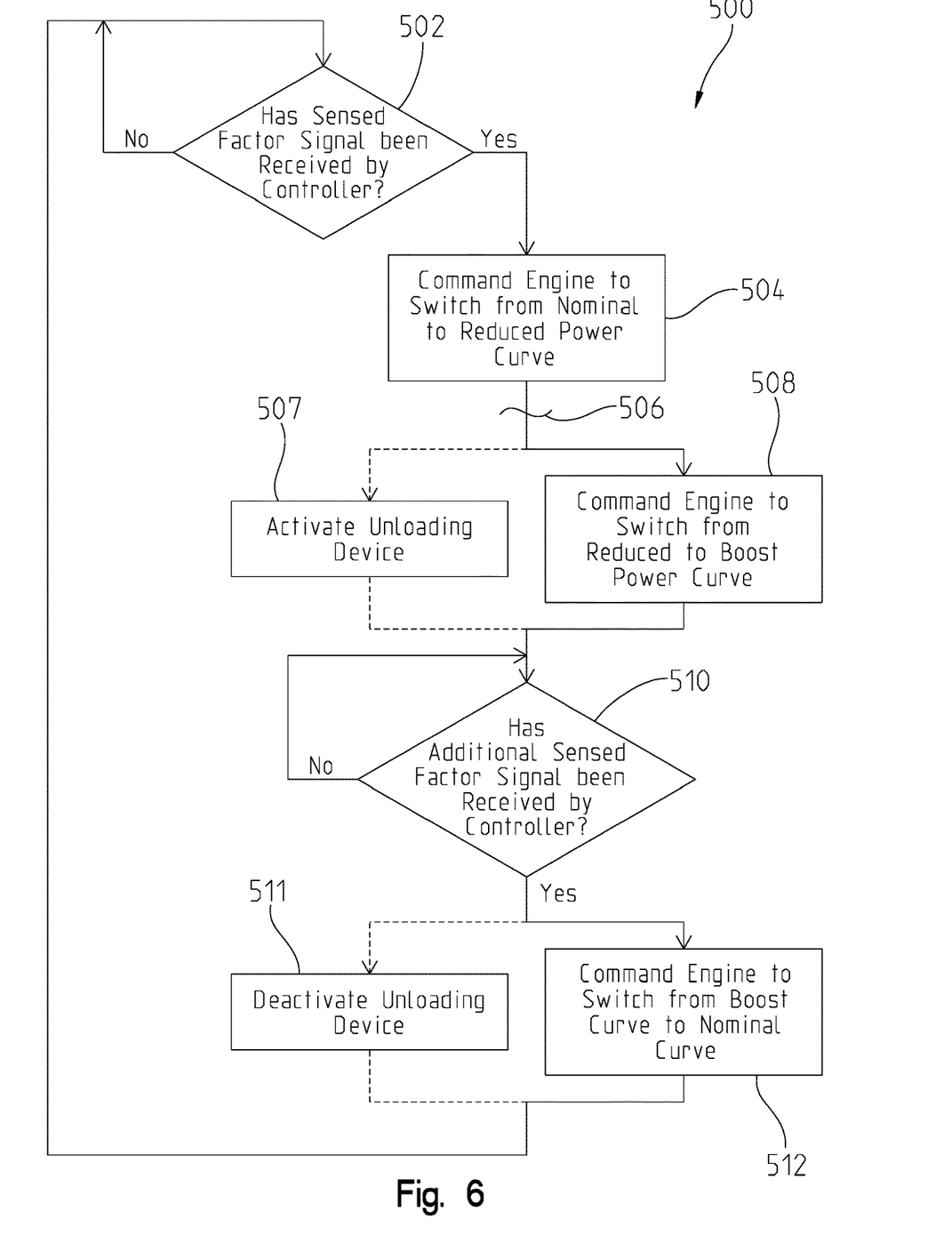
FIG. 6 illustrates a flow chart showing a method of operation of the work machine based on at least one sensed factor associated with the harvested crop, which may include crop level in the tank.

FIG. 6 illustrates a method of operation 500, which is similar to the method of operation 400. Methods steps 502 and 510 are generalized compared to their counterpart steps, 402 and 410, respectively. Rather than determining whether threshold crop levels have been surpassed (steps 402, 410), steps 502 and 510 evaluate whether signal(s) indicating one or more factors associated with the harvested crop have been received by the controller 34. As described above, the one or more sensed factors associated with the harvested crop include: for example: (i) amount of harvested crop in the tank 28, (ii) flow rate of harvested crop into the tank 28, (iii) moisture level of harvested crop in the tank 28, (iv) weight of harvested crop in the tank 28, (v) type of crop being harvested based on whether the harvester assembly is a grain harvester 16 or a corn harvester 60. As described above, each sensor 24, 54, 64, 74, and 84 may send a signal to the controller 34 indicative of a sensed factor. Unless otherwise mentioned, the control methods 400 and 500 operate consistently with one another.

In some embodiments, more than one sense factor must be received by the controller 34 to trigger the controller 34 to command the engine 32 to switch from operation in accordance with the nominal power curve 40 to operation in accordance with the reduced power curve 42. For example, the controller 34 may be programmed according to an algorithm which requires the controller 34 to receive: (a) a first signal indicating that the harvester assembly is a corn header 60, (b) a second signal indicating that the moisture level of the crop is above a predetermined moisture level threshold, and (c) a third signal indicating that the amount of crop in the tank 28 is above the upper threshold crop level.

Identifying each of the factors (a)-(c) described above, for example, is advantageous because research has demonstrated that unloading heavy (moist) corn requires additional power output from the engine 32 to drive the unloading auger 30. Therefore, with the control method described, the controller 34 is configured to operate the engine 32 at a reduced power level prior to unloading heavy (moist) corn to ensure that sufficient power remains available to increase the power level to that of the boost curve 44 during unloading.

Other factors may be used in combination as well to trigger the controller 34 to command the engine 34 to switch from operation in accordance with the nominal power curve 40 to operation in accordance with the reduced power curve 42. For example, the amount of harvested crop in the tank 28 and the flow rate of harvested crop into the tank 28 may be used together to trigger the controller 34 to adjust the engine 32 as described above. This is case, the crop level and the flow rate of harvested crop into the tank 28 may be used to predict when the tank 28 will reach a maximum capacity, at which time the tank 28 will be unloaded by the unloading device 30. Based on the identification of when the tank 28 will reach its maximum capacity, the controller 34 is triggered to command the engine 32 to switch to operation in accordance with the reduced power curve 42 at a time prior to the tank 28 reaching its maximum capacity. Other factor combinations, which are not expressly recited here may be used to trigger the controller 34 as well.

In some embodiments, the memory 38 of the controller 34 includes a plurality of additional power curves stored thereon. The plurality of additional power curves includes a first set of additional power curves having a power level between that of the first power curve 40 and the second power curve 42 over the range of engine speeds. The plurality of additional power curves further includes a second set of additional power curves having a power level between that of the second power curve 42 and the third power curve 44 over the range of engine speeds. In response to any of the triggers described above, the controller 34 may command the engine 32 to incrementally change its operation according to each successive additional power curve. This operational step is advantageous because it allows for smooth transition between any one of the first, second, and third power curves 40, 42, 44 without jolts being induced to the work machine 10 and experienced by the operator.

An example of operation according to use of the first set of additional power curves is described below. Automatic mode may be selected by the operator input device 36. The operator input device 36 may send a signal to the controller 34 indicative of the mode selection. When triggered, as described above, controller 34 commands the engine 32 to change from operation in accordance with the first power curve 40 to operation in accordance with each power curve of the first set of additional power curves successively, and finally, to operation in accordance with the second power curve 42. Thus, the controller 34 incrementally increases the power level of the engine 32 from that in accordance with the first power curve 40 to that in accordance with the second power curve 42.

In some embodiments, the memory 38 of the controller 34 may have stored thereon unique power curves associated with particular crops to be harvested. For example, a first supplementary power curve 50 and a second supplementary power curve 52 may be stored on the memory. The second supplementary power curve 52 has a lesser power level relative to the first supplementary power curve 50 over the range of engine speeds.

The first and second power curves 40, 42 may be associated, for example, with corn. The first and second supplementary power curves 50, 52 may be associated, for example, with grain. It may be advantageous to have unique power curves associated with particular crops because different crops may require different levels of boost power during unloading. Therefore, the power level reduction from the first supplementary power curve 50 to the second supplementary power curve 52 may be greater than the power level reduction from the first power curve 40 to the second power curve 42. Further, the first supplementary power curve 50 may have an increased power level relative to the first power curve 40, and the second supplementary curve 52 power curve may have an increased power level relative to the second curve 42. This is advantageous because unloading corn may require more boost power (and therefore more reserved power) than unloading grain.

An example of operation according to use of the first and second power curves 40, 42 and first and second supplementary power curves 50, 52 is described below. Automatic mode may be selected by the operator input device 36. The operator input device 36 may send a signal to the controller 34 indicative of the selected mode. The harvester sensor 54 senses the type of harvester assembly (grain platform 16 or corn header 60) that is coupled to the feederhouse 18 and sends a signal to the controller 34 indicative of such. In response to determining that the harvester assembly is a corn header 16, the controller 34 is configured to operate the engine 32 in accordance with the first supplementary power curve 50 and subsequently the second supplementary power curve 52. In response to determining that the harvester assembly is a grain platform 16, the controller 34 is configured to operate the engine 32 in accordance with the first power curve 40 and subsequently the second power curve 42. In the illustrative embodiment described here, while the power curves 50, 52 may be substituted for the power curves 40, 42, other aspects of the method of operation follow the algorithms described in FIG. 5 or 6.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A work machine comprising:
 a supporting structure;
 a harvester assembly coupled to the supporting structure;
 ground engaging mechanisms coupled to the supporting structure;
 a tank coupled to the supporting structure and configured to contain harvested crop harvested by the harvester assembly;
 an engine configured to drive rotation of the ground engaging mechanisms to move the supporting structure during operation of the work machine;
 a controller operatively coupled to the engine, the controller including a memory and a first power curve and a second power curve stored in the memory, the second power curve having a lesser power level relative to the first power curve over a range of engine speeds;
 an operator input device operatively coupled to the controller and configured to send signals to the controller;
 a crop sensor operatively coupled to the controller and configured to identify an amount of harvested crop in the tank;
 wherein the controller is configured to operate the engine, in response to signals received from the operator input device, in: (i) a nominal mode associated with the first power curve; (ii) a reserve mode associated with the second power curve; and (iii) an automatic mode associated with the first power curve and the second power curve;
 wherein, in the automatic mode, the controller is configured to change operation of the engine from operation in accordance with the first power curve to operation in accordance with the second power curve in response to at least one sensed factor associated with the harvested crop; and
 wherein the at least one sensed factor associated with the harvested crop includes a determination that the amount of harvested crop in the tank is above a predetermined upper threshold crop level.

2. The work machine of claim 1, wherein the crop sensor is configured to identify a flow rate of harvested crop into the tank; and
 wherein the at least one sensed factor associated with the harvested crop further includes the flow rate of harvested crop into the tank.

3. The work machine of claim 1, further comprising a moisture sensor operatively coupled to the controller and configured to identify the moisture level of harvested crop in the tank;
 wherein the at least one sensed factor associated with the harvested crop includes the moisture level of harvested crop in the tank.

4. The work machine of claim 1, further comprising an unloading device coupled to the engine and arranged to contact harvested crop contained in the tank;
 wherein the unloading device is configured to be switched on and off;
 wherein the unloading device is configured to remove harvested crop from the tank when switched on; and
 wherein, in automatic mode, the controller is configured to change operation of the engine from operation in accordance with the first power curve to operation in accordance with the second power curve prior to the unloading device being switched on.

5. The work machine of claim 4, wherein the controller includes a third power curve stored in the memory that has a greater power level over the range of engine speeds relative to the first power curve;
 wherein the controller is configured to operate the engine in a boost mode associated with the third power curve; and
 wherein the controller is configured to change operation of the engine from operation in accordance with the second power curve to operation in accordance with the third power curve when the unloading device is switched on.

6. The work machine of claim 1, wherein the controller includes a plurality of additional power curves stored in the memory, each additional power curve of the plurality of additional power curves having a power level between that of the first power curve and the second power curve over the range of engine speeds; and
 wherein, in automatic mode, the controller is configured to change operation of the engine from operation in accordance with the first power curve to operation in accordance with each additional power curve successively, and subsequently, to operation in accordance with the second power curve in response to at least one sensed factor associated with the harvested crop.

7. The work machine of claim 1, wherein the harvester assembly is one of: a grain harvester for harvesting grain and a corn harvester for harvesting corn; and wherein the work machine further comprises a harvester sensor operatively coupled to the controller and configured to identify whether the harvester assembly is a grain harvester or a corn harvester.

8. The work machine of claim 7, wherein the controller includes a first supplementary power curve and a second supplementary curve stored in the memory, the second supplementary curve power curve having a lesser power level relative to the first supplementary power curve power curve over the range of engine speeds;

wherein the difference in power level of the first supplementary power curve relative to the second supplementary power curve over the range of engine speeds is greater than the difference in power level of the first power curve relative to the second curve over the range of engine speeds;

wherein, in automatic mode, the controller is configured to change operation of the engine from operation in accordance with the first supplementary power curve power curve to operation in accordance with the second supplementary curve power curve in response to at least one sensed factor associated with the harvested crop;

wherein, in automatic mode, in response to determining that the harvester assembly is a grain platform, the controller is configured to operate the engine in accordance with the first power curve and subsequently the second power curve; and wherein, in automatic mode, in response to determining that the harvester assembly is a corn header, the controller is configured to operate the engine in accordance with the first supplementary power curve power curve and subsequently the second supplementary curve power curve.

9. The work machine of claim 1, further comprising a weight sensor operatively coupled to the controller and configured to identify the weight of harvested crop in the tank;

wherein the at least one sensed factor associated with the harvested crop includes the weight of harvested crop in the tank.

10. A work machine comprising:
a supporting structure;
a harvester assembly coupled to the supporting structure;
ground engaging mechanisms coupled to the supporting structure;
a tank coupled to the supporting structure and configured to contain harvested crop;
an unloading device that is configured to remove harvested crop from the tank when the unloading device is activated;
an engine coupled to the supporting structure and configured to provide power to the ground engaging mechanisms and the unloading device; and
a controller operatively coupled to the engine and including a memory having a first power curve, a second power curve, and a third power curve stored thereon,
wherein the second power curve has a lesser power level relative to the first power curve over a range of engine speeds, and the third power curve has a greater power level relative to the first power curve over the range of engine speeds;
wherein the controller is configured to change operation of the engine from operation in accordance with the first power curve to operation in accordance with the second power curve in response to at least one sensed factor associated with the harvested crop and, subsequently, to operate the engine in accordance with the third power curve when the unloading device is activated; and wherein the at least one sensed factor associated with the harvested crop includes the amount of harvested crop in the tank.

11. The work machine of claim 10, wherein the crop sensor is configured to identify a flow rate of harvested crop into the tank; and wherein the at least one sensed factor associated with the harvested crop further includes the flow rate of harvested crop into the tank.

12. The work machine of claim 10, further comprising a moisture sensor operatively coupled to the controller and configured to identify the moisture level of harvested crop in the tank; wherein the at least one sensed factor associated with the harvested crop includes the moisture level of harvested crop in the tank.

13. The work machine of claim 10, further comprising a weight sensor operatively coupled to the controller and configured to identify the weight of harvested crop in the tank; wherein the at least one sensed factor associated with the harvested crop includes the weight of harvested crop in the tank.

14. The work machine of claim 10, wherein the controller includes a plurality of additional power curves stored in the memory;

wherein each additional power curve of the plurality of additional power curves has a power level between that of the first power curve and the second power curve over the range of engine speeds; and wherein the controller is configured to change operation of the engine from operation in accordance with the first power curve to (i) operation in accordance with each additional power curve successively and subsequently to (ii) operation in accordance with the second power curve in response to at least one sensed factor associated with the harvested crop.

15. A method of operating a work machine comprising:
operating an engine of the work machine in accordance with a first power curve having a first power level over a range of engine speeds;
determining that a tank configured to contain harvested crop has been filled with harvested crop above a predetermined upper threshold crop level; and
operating the engine of the work machine in accordance with a second power curve having a second power level lesser than the first power level over the range of engine speeds, in response to determining that the tank has been filled with harvested crop above the predetermined upper threshold crop level.

16. The method of operating a work machine of claim 15, further comprising:
activating an unloading device powered by the engine to remove harvested crop from the tank subsequent to operating the engine of the work machine in accordance with the second power curve.

17. The method of operating a work machine of claim 15, further comprising:
operating the engine of the work machine, during operation of the unloading device, in accordance with a third power curve having a third power level greater than the first power level over the range of engine speeds.

18. The method of operating a work machine of claim 15, further comprising:
determining that the moisture level of the harvested crop in the tank is above a predetermined harvested crop moisture level threshold prior to operating the engine of the work machine in accordance with the second power curve; and wherein operating the engine of the work machine in accordance with the second power curve further includes:

operating the engine of the work machine in accordance with the second power curve in response to determining that the moisture level of the harvested crop in the tank is above the predetermined harvested crop moisture level threshold.

\* \* \* \* \*